(12) United States Patent
Hargil et al.

(10) Patent No.: US 9,081,562 B2
(45) Date of Patent: *Jul. 14, 2015

(54) UNPACKING PACKED DATA IN MULTIPLE LANES

(71) Applicant: Intel Corporation, Santa Clara, CA (US)

(72) Inventors: Asaf Hargil, Binyamina (IL); Doron Orenstein, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,908

(22) Filed: Mar. 15, 2013

(65) Prior Publication Data

US 2013/0232321 A1 Sep. 5, 2013

Related U.S. Application Data

(63) Continuation of application No. 12/494,667, filed on Jun. 30, 2009.

(51) Int. Cl.
*G06F 15/00* (2006.01)
*G06F 15/76* (2006.01)
*G06F 9/30* (2006.01)

(52) U.S. Cl.
CPC ........ *G06F 9/30145* (2013.01); *G06F 9/30032* (2013.01); *G06F 9/30036* (2013.01)

(58) Field of Classification Search
None
See application file for complete search history.

(56) References Cited

U.S. PATENT DOCUMENTS

| 5,802,336 | A | 9/1998 | Peleg et al. |
| 5,819,101 | A | 10/1998 | Peleg et al. |
| 5,881,275 | A | 3/1999 | Peleg et al. |
| 6,041,404 | A | 3/2000 | Roussel et al. |
| 6,119,216 | A | 9/2000 | Peleg et al. |
| 6,516,406 | B1 | 2/2003 | Peleg et al. |

(Continued)

FOREIGN PATENT DOCUMENTS

| CN | 101097512 A | 1/2008 |
| EP | 664508 A2 | 7/1995 |

(Continued)

OTHER PUBLICATIONS

Lee et al. (PLX: An Instruction Set Architecture and Testbed for Multimedia Information Processing, May 2005, pp. 85-108).*

(Continued)

*Primary Examiner* — George Giroux
(74) *Attorney, Agent, or Firm* — Vecchia Patent Agent, LLC

(57) ABSTRACT

Receiving an instruction indicating first and second operands. Each of the operands having packed data elements that correspond in respective positions. A first subset of the data elements of the first operand and a first subset of the data elements of the second operand each corresponding to a first lane. A second subset of the data elements of the first operand and a second subset of the data elements of the second operand each corresponding to a second lane. Storing result, in response to instruction, including: (1) in first lane, only lowest order data elements from first subset of first operand interleaved with corresponding lowest order data elements from first subset of second operand; and (2) in second lane, only highest order data elements from second subset of first operand interleaved with corresponding highest order data elements from second subset of second operand.

17 Claims, 10 Drawing Sheets

(56) References Cited

U.S. PATENT DOCUMENTS

| | | | |
|---|---|---|---|
| 7,085,795 | B2 | 8/2006 | Debes et al. |
| 7,107,435 | B2 | 9/2006 | Brady et al. |
| 7,155,601 | B2 | 12/2006 | Chennupaty et al. |
| 7,475,392 | B2 | 1/2009 | Eichenberger et al. |
| 8,078,836 | B2 | 12/2011 | Sperber et al. |
| 2004/0054879 | A1 | 3/2004 | Macy, Jr. et al. |
| 2005/0125637 | A1 | 6/2005 | Dijksktra et al. |
| 2005/0132165 | A1* | 6/2005 | Ford et al. .................. 712/22 |
| 2007/0106882 | A1 | 5/2007 | Thornton |
| 2008/0215855 | A1 | 9/2008 | Abdallah et al. |
| 2009/0172358 | A1* | 7/2009 | Sperber et al. ............. 712/208 |
| 2010/0332794 | A1 | 12/2010 | Hargil et al. |

FOREIGN PATENT DOCUMENTS

| | | |
|---|---|---|
| JP | 08-328849 A | 12/1996 |
| JP | 2005174293 A | 6/2005 |
| JP | 2005-535966 A | 11/2005 |
| JP | 2012-530977 A | 12/2012 |
| TW | 515167 B | 12/2002 |
| TW | 545015 B | 8/2003 |
| WO | 2011/002773 A2 | 1/2011 |
| WO | 2011/002773 A3 | 4/2011 |

OTHER PUBLICATIONS

Office Action received for Japanese Patent Application No. 2013-257244, mailed on Nov. 25, 2014, 7 pages of English Translation and 6 pages of Japanese Office Action.

Office Action received for Taiwanese Patent Application No. 099119943, mailed on Nov. 4, 2013, 10 pages of Office Action including 5 pages of English Translation.

Office Action received for Korean Patent Application No. 10-2011-7031020, mailed on Jul. 10, 2013, 8 pages of Office Action including 5 pages of English Translation.

Office Action received for German Patent Application No. 112010002773.0, mailed on Jul. 22, 2014, 19 pages of Office Action including 9 pages of English Translation.

Office Action received for U.S. Appl. No. 12/494,667, mailed on Feb. 22, 2013, 18 pages.

Office Action received for U.S. Appl. No. 12/494,667, mailed on Jun. 19, 2012, 17 pages.

Office Action received for U.S. Appl. No. 12/494,667, mailed on Mar. 11, 2014, 20 pages.

Office Action received for Chinese Patent Application No. 201080029694.1, mailed on Oct. 18, 2013, 48 pages of Office Action including 32 pages of English Translation.

Office Action received for Japanese Patent Application No. 2012-516388, mailed on Jun. 25, 2013, 4 pages of Japanese Office Action including 2 pages of English Translation.

Culler, D. E., "Computer Science 252: Graduate Computer Architecture, Lecture 20—Vector Processing => Multimedia", Sep. 4, 2002, 9 pages.

International Preliminary Report on Patentability and Written Opinion received for PCT Patent Application No. PCT/US2010/040395, mailed on Jan. 12, 2012, 6 pages.

Office Action received for Chinese Patent Application No. 201080029694.1, mailed on Aug. 12, 2014, 45 pages of Office Action including 30 pages of English Translation.

Office Action received for Great Britain Patent Application No. 1119082.4, mailed on Nov. 7, 2014, 2 pages.

Office Action received for U.S. Appl. No. 12/494,667, mailed on Nov. 20, 2014, 20 pages.

Firasta, N., "Intel AVX: New Frontiers in Performance Improvements and Energy Efficiency", White Paper, Mar. 2008, pp. 1-9.

"Intel 64 and IA-32 Architectures Software Developer's Manual vol. 2A: Instruction Set Reference, A-M" Intel Mar. 2009, Order#253666-030US pp. i-xxii, 1-1 thru 3-25,4-482 thru 4-493,4-290 thru 4-294,4-284 thru 4-289.

"Intel Advanced Vector Extensions Programming Reference", Intel Jan. 2009, Reference #319433-005 initial pp. 1-13(i-ii, 1-8, 1-2, I) 1.1 thru 5-12, 5-429 thru 5-436, 5-487 thru 5-496.

Kreitzer, D., "Ensuring Development Success by Understanding and Analyzing Assembly Language for IA-32 and Intel 64 Instruction Set Architecture", White Paper, Jan. 2009, 28 pages.

Lee et al., "PLX: An Instruction Set Architecture and Testbed for Multimedia Information Processing", May 2005, pp. 85-108.

Singhal, R., "Inside Intel Next Generation Nehalem Microarchitecture" Intel Developer Forum May 19, 2009, 33 pages.

Notice of Allowance received for Taiwanese Patent Application No. 099119943, mailed on Apr. 16, 2014, 2 pages of Notice of Allowance only.

Notice of Allowance received for Japanese Patent Application No. 2012-516388, mailed on Nov. 12, 2013, 1 pages of Notice of Allowance Only.

Office Action received for Chinese Patent Application No. 201080029694.1, mailed on Apr. 3, 2015, 15 pages of English Translation and 8 Pages of Chinese Office Action.

Office Action received for Japanese Patent Application No. 2013-257244, mailed on Mar. 10, 2015, 1 pages of English Translation and 1 Pages of Japanese Office Action.

* cited by examiner

UNPACKING PACKED DATA IN MULTIPLE LANES

CROSS REFERENCE TO OTHER APPLICATIONS

The present application is a continuation of U.S. patent application Ser. No. 12/494,667, filed Jun. 30, 2009, entitled "UNPACKING PACKED DATA IN MULTIPLE LANES", now pending. application Ser. No. 12/494,667 is hereby incorporated by reference.

BACKGROUND

1. Field

Embodiments relate to processors, methods performed by processors, systems incorporating processors, or instructions processed by processors. In particular, embodiments relate to processors, methods, systems, or instructions to unpack packed data in multiple lanes.

2. Background Information

Improving the performance of computers and other processing systems generally tends to increase the amount of data that may be processed and/or provide a better user experience. As computer and other processing systems handle increasingly larger amounts of data, techniques to expedite such processing of data tend to become more important.

Single Instruction, Multiple Data (SIMD) architectures are one way to expedite processing of data. In SIMD architectures, instead of one instruction operating on only one data element, the instruction may operate on multiple data elements simultaneously or in parallel. Representatively, in SIMD architectures multiple data elements may be packed within one register or memory location. Parallel execution hardware responsive to the instruction may perform multiple operations simultaneously or in parallel. Such SIMD architectures tend to significantly improve system performance.

One known type of SIMD instruction is an unpack instruction. Some known processors include a variety of different unpack instructions. For example, the Intel® Core™ 2 Duo Processor, among others from Intel Corporation, includes various unpack instructions such as those detailed in the Intel Architecture Software Developer's Manual: Vol. 2: Instruction Set Reference, 1999 (Order Number 243191).

However, additional unpack instructions and operations may be useful under some conditions and for some applications.

BRIEF DESCRIPTION OF THE SEVERAL VIEWS OF THE DRAWINGS

Embodiments of the invention may best be understood by referring to the following description and accompanying drawings that are used to illustrate embodiments of the invention. In the drawings.

DETAILED DESCRIPTION

In the following description, numerous specific details, such as processor types, data types, data formats, register types, register arrangements, system configurations, and the like, are set forth. However, it is understood that embodiments of the invention may be practiced without these specific details. In other instances, well-known circuits, structures and techniques have not been shown in detail in order not to obscure the understanding of this description.

Figure 1:
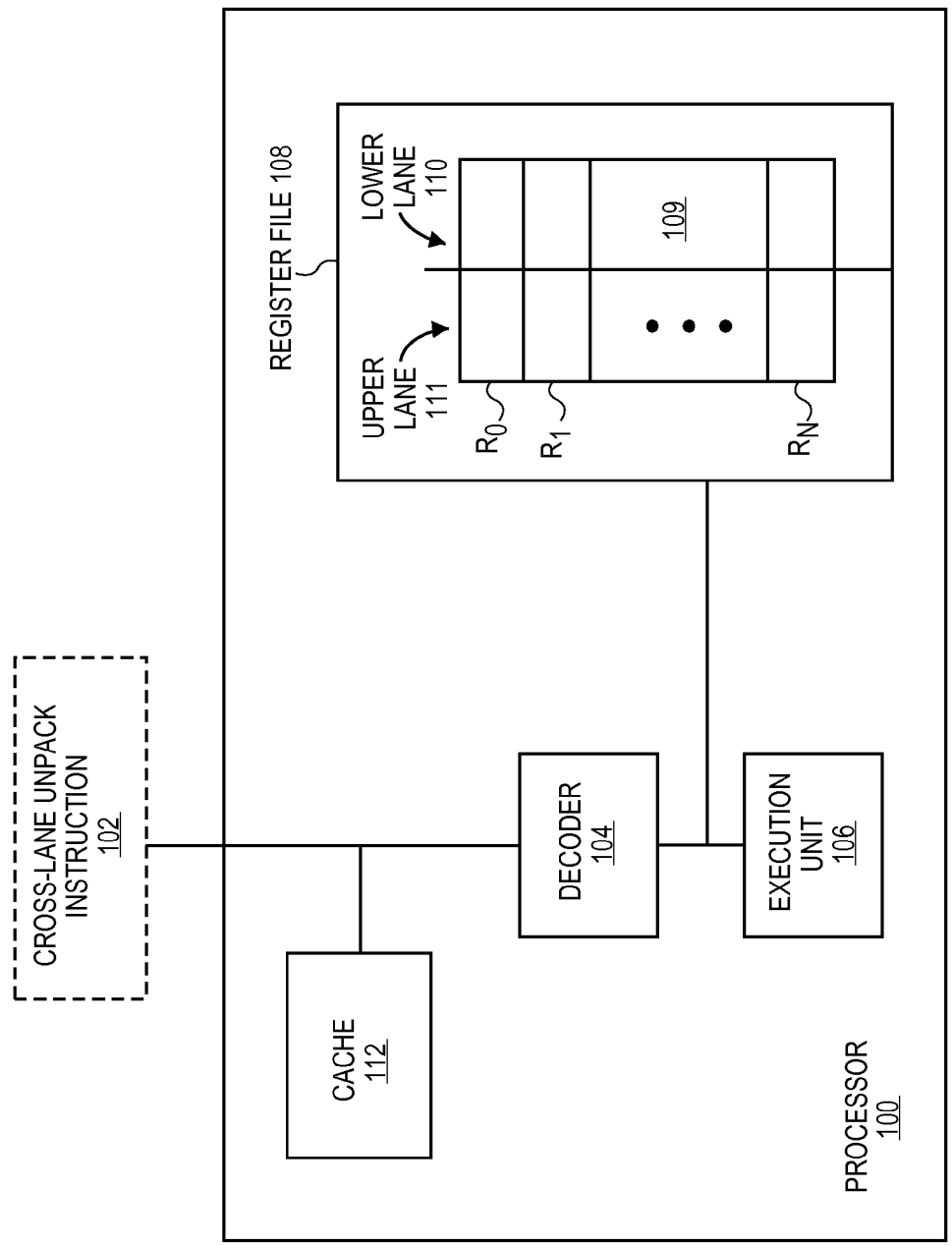
FIG. 1 illustrates one example embodiment of a processor.

FIG. 1 illustrates one example embodiment of a processor 100. The processor is capable of, or operable to, execute a cross-lane unpack instruction 102 as discussed elsewhere herein.

The processor may be any of various different types of processors that are capable of executing instructions. For example, the processor may be a general-purpose processor, such as a PENTIUM® 4, PENTIUM® Dual-Core, Core™ 2 Duo and Quad, Xeon™, Itanium®, XScale™ or StrongARM™ microprocessor, which are available from Intel Corporation, of Santa Clara, Calif. Alternatively, the processor may be from another company. The processor may be a reduced instruction set computing (RISC) processor, a complex instruction set computing (CISC) processor, a very long instruction word (VLIW) processor, or a hybrid or alternative processor type. As yet another option, the processor may be a special-purpose processor, such as, for example, a network or communication processor, co-processor, embedded processor, compression engine, graphics processor, or the like. The processor may be implemented on one or more chips.

During use, the processor is operable to receive the cross-lane unpack instruction 102. The unpack instruction may represent a control signal that is operable to cause the processor to perform unpack operations as discussed further below. The unpack instruction may be provided by a software sequence or algorithm, for example.

The illustrated embodiment of the processor includes an instruction decoder 104. The decoder may receive the cross-lane unpack instruction. The decoder may decode the unpack instruction, and generate as an output one or more micro-operations, micro-code entry points, microinstructions, other instructions, or other control signals, which are decoded from, or which otherwise reflect, or are derived from, the original unpack instruction. The decoder may be implemented using various different mechanisms. Examples of suitable mechanisms include, but are not limited to, look-up tables, hardware implementations, programmable logic arrays (PLAs), microcode random access memories (ROMs), etc.

In some cases, the decoder may be replaced with an instruction translator, an instruction emulator, or other instruction converter. The instruction converter may convert an instruction from a source instruction set to a target instruction set. For example, the instruction converter may translate, morph, emulate, or otherwise convert an unpack instruction as described herein to one or more other instructions to be processed by an execution unit. The instruction converter may be implemented in software, hardware, firmware, or a combination thereof. The instruction converter may be on processor, off processor, or part on and part off processor. Accordingly, the decoder is not a required component of the processor.

The processor includes at least one execution unit 106. The execution unit is coupled with, or otherwise in communication with, the decoder, or an instruction translator or other instruction converter as discussed above. The execution unit may include a circuit or execution logic operable to or capable of executing unpack instruction. For example, the execution unit may execute one or more micro-operations, microinstructions, or other instructions or control signals, which are decoded from, translated from, emulated from, or which otherwise reflect, or are derived from, the original unpack instruction. In one or more embodiments, the execution unit may have specialized logic to process machine instructions or micro-ops or instructions derived from these machine instructions. That is, the execution unit may perform operations as a result of, or in response to, the cross-lane unpack instruction. In one or more embodiments, the execution unit and/or the processor may perform operations as a result of, or in response to, most or all Intel Architecture instructions, such as, for example, those used in the PENTIUM® 4, PENTIUM® Dual-Core, Core™ 2 Duo and Quad, Xeon™, Itanium®, XScale™ or StrongARM™ microprocessors.

Some embodiments may include only a single execution unit, or a single execution unit that can perform certain operations. Other embodiments may include a number of execution units dedicated to specific functions or sets of functions. In addition, one or more embodiments of a processor may have multiple cores with each core having at least one execution unit.

The processor also includes a register file 108 coupled with the decoder and the execution unit. The term "register" is used herein to refer to a generally on-board processor storage location that is generally used by a macro-instruction to identify an operand. Generally, the registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc.

The register file may have various different types of registers. Examples of suitable types of registers include, but are not limited to, integer registers, floating point registers, vector registers, status registers, instruction pointer registers, and the like.

For simplicity, a single register set 109 is shown. The register set includes a group or number of registers. For example, the register set includes registers R0 through RN, where N is an integer. In one particular embodiment, N is 15. The registers may or may not be renamed.

The register set may be adapted to store packed data. Packed data comprises multiple data elements packed together. A data element may refer to an individual piece of data that is stored in a register or other storage location along with other data elements often having the same length in bits. The register set may permit access to one or various ones of the packed data elements separately from others. At different times, a particular register in a register set may hold packed data elements of different sizes, and all of the different individual sizes of packed elements may or may not all be accessible individually.

The register set has multiple lanes. In the illustrated embodiment, the register set, including each of the registers thereof, has a first, lower lane 110 and a second, upper lane 111. The lower lane has the lower most bits, while the upper lane has the uppermost bits. Each of the lanes has a plurality of bits. For example, the registers may each have 256-bits, and each of the lanes may have 128-bits. In other embodiments, the processor and/or the registers may have three, four, or more lanes, and the registers and the lanes may have different sizes.

The illustrated embodiment of the processor also includes a cache 112 coupled with the decoder. Depending on the architecture, the processor may have a single internal cache, such as, for example, a Level 1 (L1) internal cache, or multiple levels of internal cache. In some embodiments, the system may include a combination of an internal cache and an external cache that is external to the processor. Alternatively, all of the cache may be external to the processor.

To avoid obscuring the description, the processor has been shown in a simplified format. It will be appreciated by those skilled in the art that the processor may include other conventional components, circuits, or logic. For example, the processor may include front end logic, register renaming logic, scheduling logic, back end logic, retirement logic, re-order buffers, etc. Moreover, this is just one illustrative example embodiment of a processor. Other general purpose processors, special purpose processors, network or communication processors, co-processors, embedded processors, compression engines, graphics processors, or the like, may also benefit from the unpack instructions and operations disclosed herein.

Figure 2:
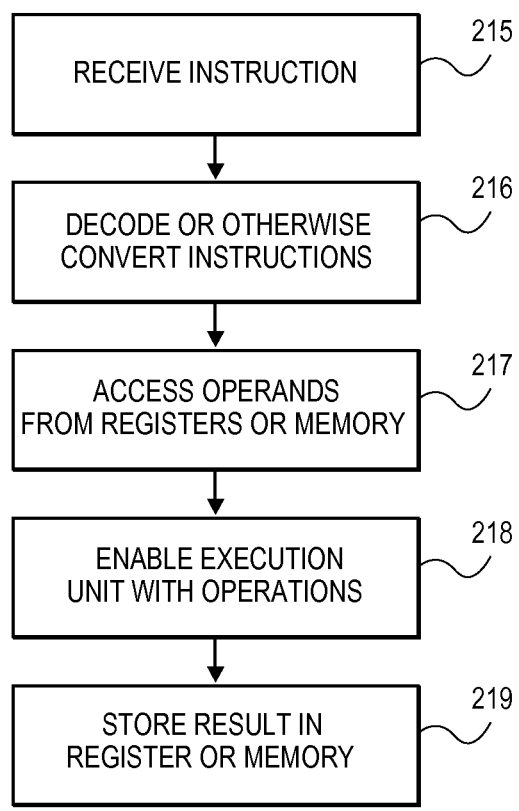
FIG. 2 is a block flow diagram of an embodiment of a method of receiving an instruction and storing a result specified by the instruction.

FIG. 2 is a block flow diagram of an embodiment of a method 214 of receiving an instruction and storing a result specified by the instruction. In one or more embodiments, the method may be performed by a processor as a result of an unpack instruction as disclosed elsewhere herein.

The instruction may be received, at block 215. The instruction may represent a machine instruction in an instruction set of the processor. By way of example, the instruction may be received at a processor, or at a decoder, or other portion of the processor. Representatively, the instruction may be received from a cache, such as, for example, cache 112, or a bus or other interconnect.

The instruction may be decoded, at block 216. The instruction may be decoded into one or more micro-operations, micro-code entry points, microinstructions, other instructions, or other control signals, which are decoded from, or which otherwise reflect, or are derived from, the original unpack instruction. Alternatively, the instruction may be translated, emulated, or otherwise converted, as previously mentioned.

The decoder or another portion of the processor may access and/or receive one or more operands indicated by the instruction, at block 217. The operands may be accessed and/or received from registers (e.g., register set 109), memory locations, or a combination thereof. The instruction may specify the addresses of the registers or memory locations of the operands. For example, the instruction may specify an address of a first source operand (SRC1) and an address of a second source operand (SRC2).

An execution unit may be enabled with operation(s) specified by the instruction, at block 218. The execution unit may perform the specified operation(s) on the data of the operands to generate a result operand.

The result operand may be stored at a destination address of a register or memory location specified by the instruction, at block 219. In one or more embodiments, in addition to SRC1 and SRC2, the instruction may also specify an address for the result operand (DEST). Alternatively, in one or more embodiments, either SRC1 or SRC2 may also be used as DEST. For example, the data at SRC1 or SRC2 may be overwritten with the result operand. In such a case, the instruction may not explicitly specify a separate DEST, although the instruction is understood to specify the destination for the result operand as one of SRC1 and SRC2.

Intel Corporation has recently introduced Intel® Advanced Vector Extensions (Intel AVX) instructions. Intel AVX provides a new 256-bit SIMD floating point vector extension to the Intel Architecture. This widens or doubles the maximum SIMD vector length of the 128-bit XMM register file in Intel® SSE4 to 256-bits. Intel AVX introduces, and many of the Intel AVX instructions operate on, 256-bit registers referenced in assembly by the names YMM0-YMM15. Further details on Intel AVX, if desired, are available in the document Intel® Advanced Vector Extensions Programming Reference (Ref.#319433-005), published January 2009, available from Intel Corporation, and at the time of filing available on the web at http://software.intel.com/en-us/avx/.

Figure 3:
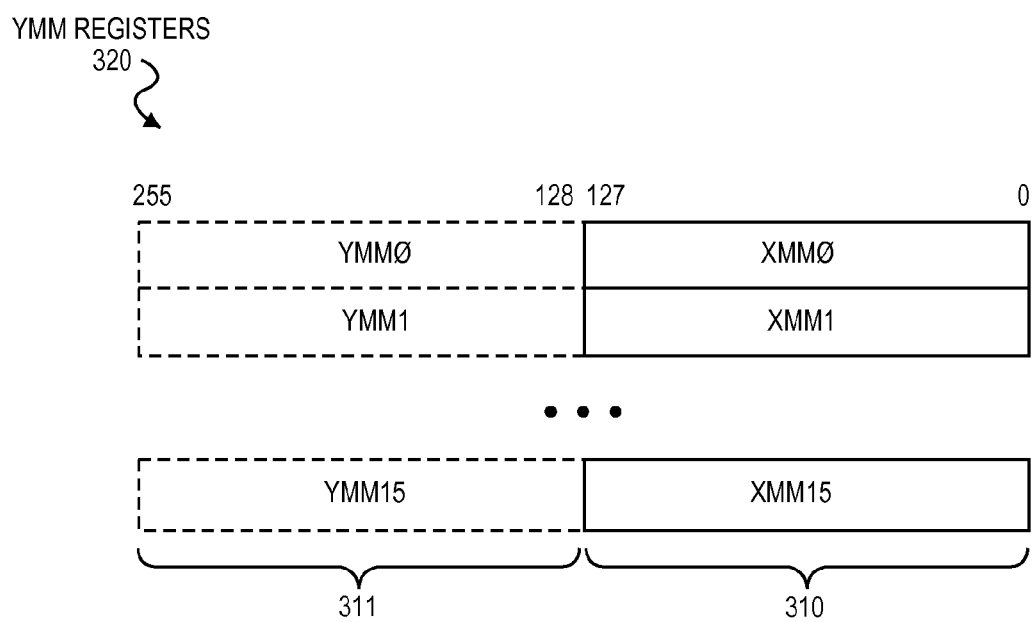
FIG. 3 shows an embodiment of YMM registers utilized by many Intel® Advanced Vector Extensions (Intel AVX) instructions.

FIG. 3 shows an embodiment of YMM registers 320 utilized by many Intel AVX instructions. The YMM registers include registers YMM0 through YMM15. Each of the YMM registers has 256-bits. As shown, in one or more embodiments, the lower 128-bits of the YMM registers are aliased to the respective 128-bit XMM registers, although this is not required. The registers YMM0-YMM15 are constructed from two 128-bit lanes. A lower 128-bit lane 310 (bits 0 to 127) corresponds to the XMM registers. An upper 128-bit lane 311 (bits 128 to 255) corresponds to the YMM registers.

Figure 4:
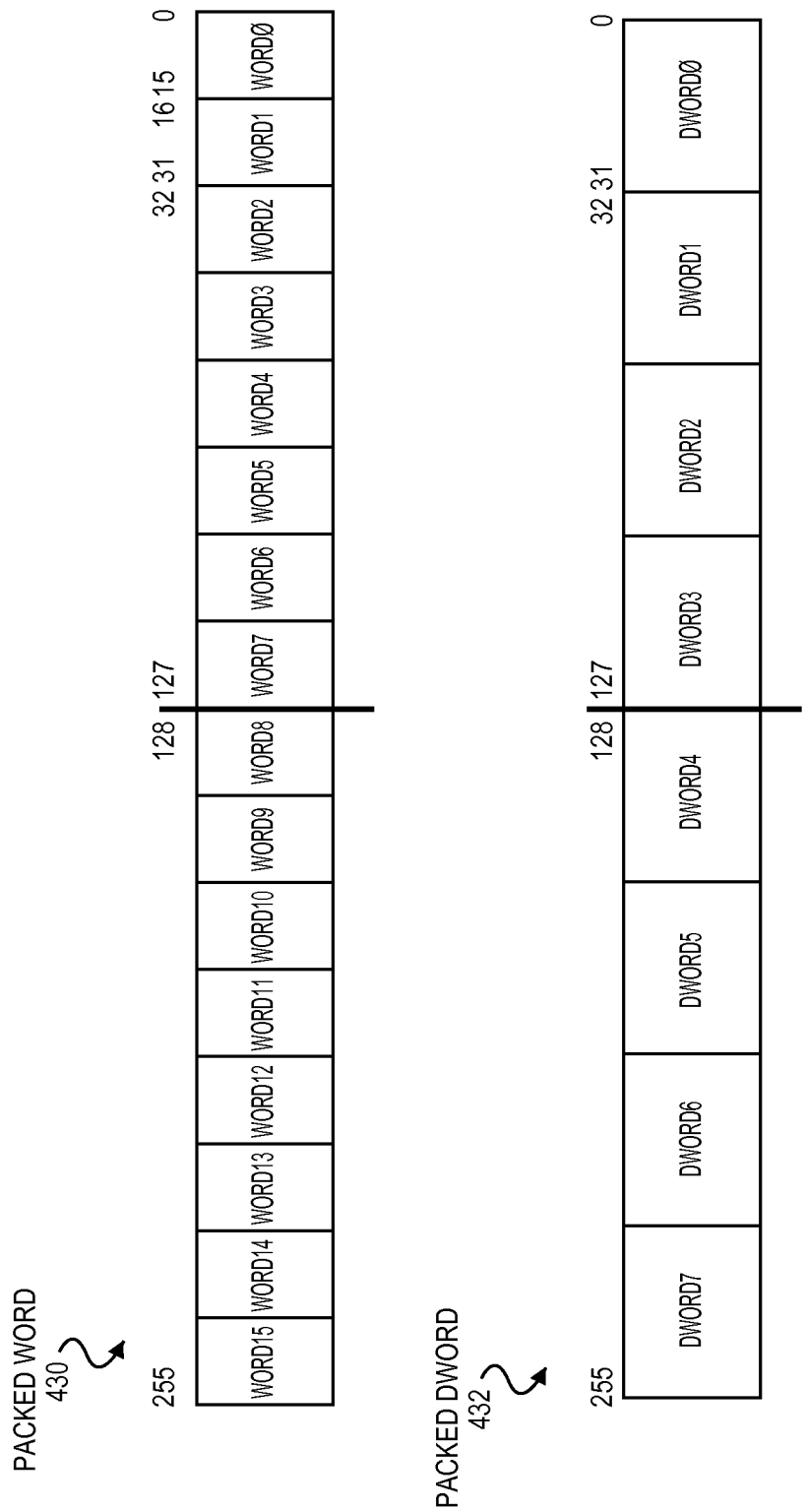
FIG. 4 shows representative examples of packed data formats suitable for one or more embodiments of the invention.

FIG. 4 shows representative examples of packed data formats suitable for one or more embodiments of the invention. Two example packed data formats are illustrated, namely packed word 430, and packed doubleword 432. To better illustrate certain concepts, these packed data formats are shown for 256-bit storage locations, such as, for example, YMM registers, although the scope of embodiments of the invention are not so limited.

Packed word format 430 is 256-bits long and includes sixteen data elements. Each data element is 16-bits or one word long. Such 16-bit data elements are referred to as "words". In the illustration, the data elements are labeled, from low order to high order, "word0" through "word15". Word0 through word7 correspond to a lower lane (on the right; bits 0 to 127). Word8 through word15 correspond to an upper lane (on the left; bits 128 to 255).

Packed doubleword (dword) format 432 is 256-bits long and includes 8 data elements. Each data element is 32-bits or one doubleword (dword) long. Such 32-bit data elements are referred to as "dwords". 32-bit data elements are commonly used for single precision floating point calculations. In the illustration, the data elements are labeled, from low order to high order, "dword0" through "dword15". Dword0 through dword3 correspond to a lower lane. Dword4 through dword7 correspond to an upper lane.

These are just two illustrative examples. Other packed data formats are also suitable. For example, packed byte formats, in which each data element has 8-bits, and packed quadword formats, in which each data element has 64-bits, are also suitable. 64-bit data elements are commonly used for double precision floating point calculations. Larger sizes beyond 64-bit data elements are also suitable. Moreover, registers larger or smaller than 256-bits may be used. In general, a packed data format includes multiple data elements. Commonly, the data elements are the same size. In such a case, the size of the register divided by the size of the data elements is equal to the number of data elements.

Intel AVX utilizes registers having multiple multi-bit lanes. Certain Intel AVX instructions are known as "in-lane" instructions. Such "in-lane" instructions cause the same operation to be performed on both 128-bit halves or lanes of one or more YMM registers. For example, the UNPCKLPS (VEX.256 encoded version) instruction of Intel AVX causes the same unpack low operation to be performed on both 128-bit halves or lanes of the YMM registers. Currently, there is no known "cross-lane" unpack instruction in which different unpack operations (e.g., unpack low versus unpack high) are performed on different lanes. Accordingly, in some applications or under some conditions, additional operations, such as extracts, casts, etc., may be needed to rearrange results of such "in-lane" unpack instructions, which may require extra computation and/or complicate programming. Alternatively, use of older SSE unpack instructions may not take full advantage of the newer 256-bit YMM registers. Accordingly, additional unpack instructions and operations may be useful under some conditions or for some applications. For example, unpack instructions more useful for Structure of Arrays (SoA) to Array of Structures (AoS) algorithms would be beneficial Embodiments of the invention pertain to processors, methods performed by processors, systems incorporating processors, or instructions executed or processed by processors to unpack packed data in multiple lanes in which an unpack operation performed on at least one lane is of a different type than an unpack operation performed on at least one other lane. Embodiments of the invention pertain to "cross-lane" unpack instructions that specify unpack low operations for at least one lane and unpack high operations for at least one other lane, or to processors to process the cross-lane unpack instructions, methods performed by processors as a result of processing the cross-lane unpack instructions, or computer systems or other systems incorporating such processors.

Figure 5:
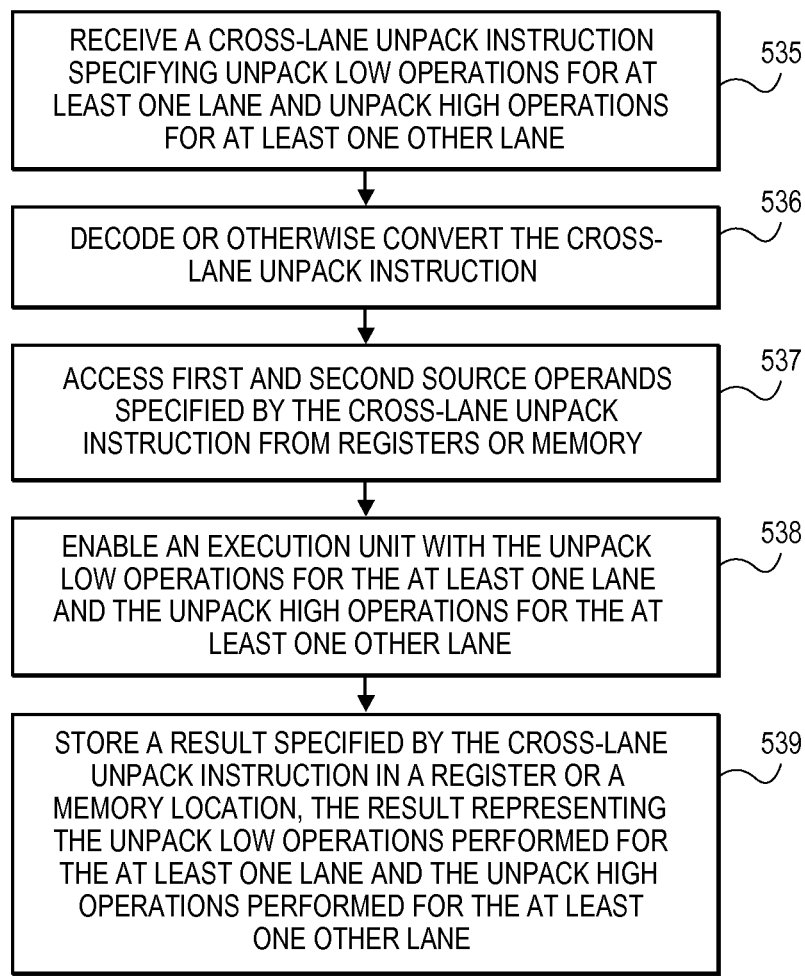
FIG. 5 is a block flow diagram of an example embodiment of a cross-lane unpack method.

FIG. 5 is a block flow diagram of an example embodiment of a cross-lane unpack method 534.

A cross-lane unpack instruction may be received, at block 535. The cross-lane unpack instruction may specify unpack low operations for at least one lane and unpack high operations for at least one other lane.

The cross-lane unpack instruction may be decoded, at block 536. Alternatively, the instruction may be translated, emulated, or otherwise converted.

First and second source operands specified or indicated by the cross-lane unpack instruction may be accessed, at block 537. The operands may be accessed from registers or memory locations. The cross-lane unpack instructions may have first and second fields to indicate the operands.

An execution unit may be enabled with the unpack low operations for the at least one lane and with the unpack high operations for the at least one other lane, at block 538.

A result specified by the cross-lane unpack instruction may be stored in a register or memory location, at block 539. The result may represent the unpack low operations performed for the at least one lane and the unpack high operations performed for the at least one other lane.

FIGS. 6-9 illustrate various example embodiments of unpacking packed data from first and second operands having multiple lanes according to a single cross-lane unpack instruction that specifies unpack low operations for at least one lane and unpack high operations for at least one other lane.

Figure 6:
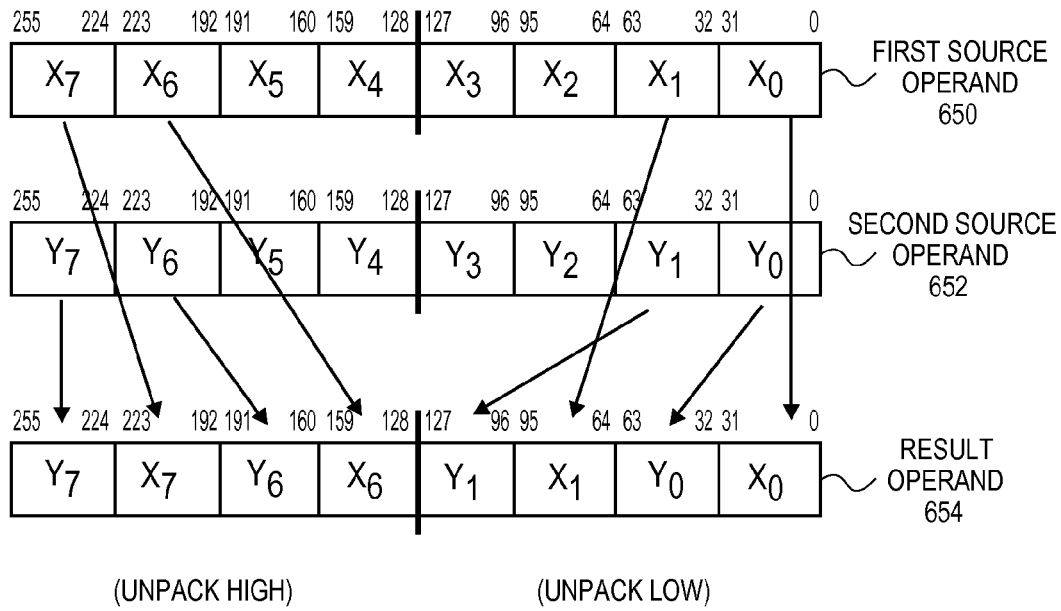
FIG. 6 illustrates unpacking 32-bit doubleword packed data elements in 256-bit operands having two lanes according to a first single cross-lane unpack instruction that specifies unpack low operations for a lower lane and unpack high operations for an upper lane.

FIG. 6 illustrates unpacking 32-bit doubleword (dword) packed data elements in 256-bit operands having two lanes according to a first single cross-lane unpack instruction that specifies unpack low operations for a lower lane (bits 0 to 127) and unpack high operations for an upper lane (bits 128 to 255).

A first source operand 650 has 256-bits and stores eight packed 32-bit or doubleword data elements. The first source operand may be stored in a register (e.g., a YMM register), a memory, or another storage location. These data elements are labeled, from low order to high order, X0 through X7. In more detail, the first source operand includes a first data element (X0) represented by bits 0 through 31, a second data element (X1) represented by bits 32 through 63, a third data element (X2) represented by bits 64 through 95, a fourth data element (X3) represented by bits 96 through 127, a fifth data element (X4) represented by bits 128 through 159, a sixth data element (X5) represented by bits 160 through 191, a seventh data element (X6) represented by bits 192 through 223, and an eighth data element (X7) represented by bits 224 through 255. Data elements X0 through X3 represent a lower lane subset of data elements that correspond to the lower lane. Data elements X4 through X7 represent an upper lane subset of data elements that correspond to the upper lane.

Similarly, a second source operand 652 has 256-bits and stores eight packed 32-bit or dword data elements. The first source operand may be stored in a register (e.g., a YMM register), a memory, or another storage location. These data elements are labeled, from low order to high order, Y0 through Y7. In more detail, the second source operand includes a ninth data element (Y0) represented by bits 0 through 31, a tenth data element (Y1) represented by bits 32 through 63, an eleventh data element (Y2) represented by bits 64 through 95, a twelfth data element (Y3) represented by bits 96 through 127, a thirteenth data element (Y4) represented by bits 128 through 159, a fourteenth data element (Y5) represented by bits 160 through 191, a fifteenth data element (Y6) represented by bits 192 through 223, and a sixteenth data element (Y7) represented by bits 224 through 255. Data elements Y0 through Y3 represent a lower lane subset of data elements that correspond to a lower lane. Data elements Y4 through Y7 represent an upper lane subset of data elements that correspond to an upper lane.

A result operand 654 stores a result. The result is generated based on performing unpack operations specified by the first cross-lane unpack instruction. The result may be stored by an execution unit, a functional unit, or another portion of a processor as a result of the cross-lane unpack instruction (e.g., as a result of an execution unit executing one or more micro-instructions or other instructions decoded, translated, or otherwise derived from the instruction).

The result operand has 256-bits and stores eight packed 32-bit or doubleword data elements. The eight data elements in the result operand represent a subset, less than all, or half of the unpacked and interleaved data elements selected from the first and second source operands according to unpack operations specified by the first cross-lane unpack instruction.

This particular first cross-lane unpack instruction specifies unpack low operations for the lower lane (bits 0 to 127) and unpack high operations for the upper lane (bits 128 to 255). The unpack low operations for the lower lane may include an interleaved unpack of only the low order 32-bit or doubleword data elements from the low order quadwords (64-bits) in the lower lane of the first and second source operands. The unpack high operations for the upper lane may include an interleaved unpack of only the high order 32-bit or doubleword data elements from the high order quadwords (64-bits) in the upper lane of the first and second source operands.

As shown, the result stored may include: (1) in the lower lane, only lowest order data elements from the lower lane subset of the first operand interleaved with corresponding lowest order data elements from the lower lane subset of the second operand; and (2) in the upper lane, only highest order data elements from the upper lane subset of the first operand interleaved with corresponding highest order data elements from the upper lane subset of the second operand.

In more detail, the result operand may include the first data element (X0) stored to bits 0 through 31 of a destination register, the ninth data element (Y0) stored to bits 32 through 63 of the destination register, the second data element (X1) stored to bits 64 through 95 of the destination register, the tenth data element (Y1) stored to bits 96 through 127 of the destination register, the seventh data element (X6) stored to bits 128 through 159 of the destination register, the fifteenth data element (Y6) stored to bits 160 through 191 of the destination register, the eighth data element (X7) stored to bits 192 through 223 of the destination register, and the sixteenth data element (Y7) stored to bits 224 through 255 of the destination register.

The result operand has only a subset (in particular half) of the data elements from the first and second operands. The lower lane of the result operand has only a subset (in particular half) of the data elements from the lower lane of the first and second operands. Likewise, the upper lane of the result operand has only a subset (in particular half) of the data elements from the upper lane of the first and second operands.

Also, the lower order data elements X0 and X1, and also the lower order data elements Y0 and Y1, are stored in the same relative order (i.e., X0 at a lower bit order than X1; and Y0 at a lower bit order than Y1) in the lower lane of the result operand as these data elements appear in the lower lane of the first and second operands, respectively. Likewise, the higher order data elements X6 and X7, and also the higher order data elements Y6 and Y7, are stored in the same relative order in the upper lane of the result operand as these data elements appear in the upper lane of the first and second operands, respectively.

Figure 7:
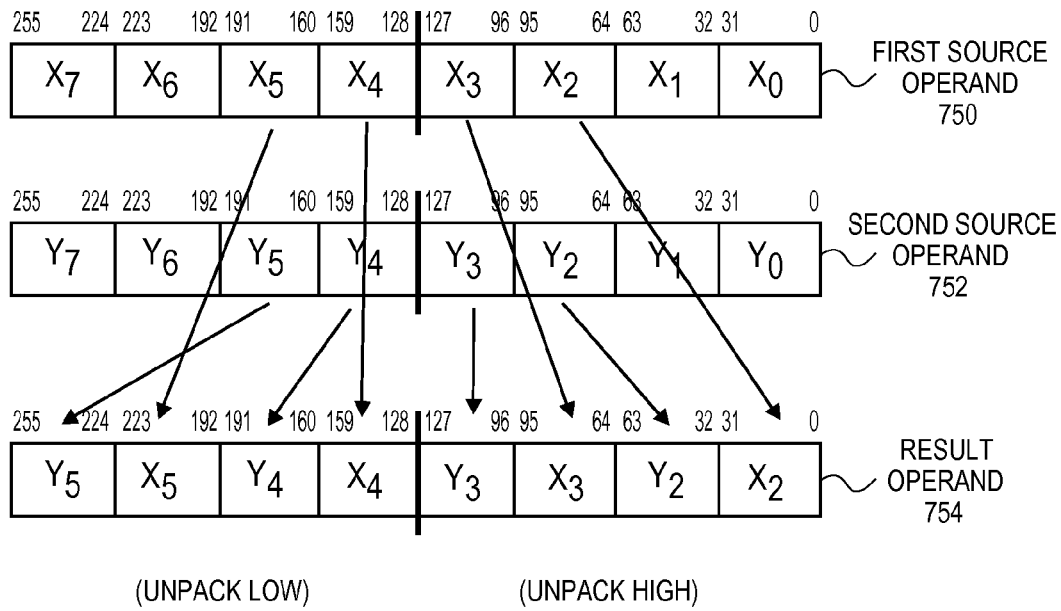
FIG. 7 illustrates unpacking 32-bit doubleword packed data elements in 256-bit operands having two lanes according to a second single cross-lane unpack instruction that specifies unpack high operations for a lower lane and unpack low operations for an upper lane.

FIG. 7 illustrates unpacking 32-bit doubleword (dword) packed data elements in 256-bit operands having two lanes according to a second single cross-lane unpack instruction that specifies unpack high operations for a lower lane (bits 0 to 127) and unpack low operations for an upper lane (bits 128 to 255).

A first source operand 750 has 256-bits and stores eight packed 32-bit or doubleword data elements. The first source operand may be stored in a register (e.g., a YMM register), a memory, or another storage location. These data elements are labeled, from low order to high order, X0 through X7. In more detail, the first source operand includes a first data element (X0) represented by bits 0 through 31, a second data element (X1) represented by bits 32 through 63, a third data element (X2) represented by bits 64 through 95, a fourth data element (X3) represented by bits 96 through 127, a fifth data element (X4) represented by bits 128 through 159, a sixth data element (X5) represented by bits 160 through 191, a seventh data element (X6) represented by bits 192 through 223, and an eighth data element (X7) represented by bits 224 through 255. Data elements X0 through X3 correspond to the lower lane. Data elements X4 through X7 correspond to the upper lane.

Similarly, a second source operand 752 has 256-bits and stores eight packed 32-bit or dword data elements. The first source operand may be stored in a register (e.g., a YMM register), a memory, or another storage location. These data elements are labeled, from low order to high order, Y0 through Y7. In more detail, the second source operand includes a ninth data element (Y0) represented by bits 0 through 31, a tenth data element (Y1) represented by bits 32 through 63, an eleventh data element (Y2) represented by bits 64 through 95, a twelfth data element (Y3) represented by bits 96 through 127, a thirteenth data element (Y4) represented by bits 128 through 159, a fourteenth data element (Y5) represented by bits 160 through 191, a fifteenth data element (Y6) represented by bits 192 through 223, and a sixteenth data element (Y7) represented by bits 224 through 255. Data elements Y0 through Y3 correspond to a lower lane. Data elements Y4 through Y7 correspond to an upper lane.

A result operand 754 stores a result. The result is generated based on performing unpack operations specified by the second cross-lane unpack instruction. The result may be stored by an execution unit, a functional unit, or another portion of a processor as a result of the cross-lane unpack instruction (e.g., as a result of an execution unit executing one or more microinstructions or other instructions decoded, translated, or otherwise derived from the instruction).

The result operand has 256-bits and stores eight packed 32-bit or doubleword data elements. The eight data elements in the result operand represent a subset, less than all, or in this case half of the unpacked and interleaved data elements selected from the first and second source operands according to unpack operations specified by the second cross-lane unpack instruction.

This particular second cross-lane unpack instruction specifies unpack high operations for the lower lane (bits 0 to 127) and unpack low operations for the upper lane (bits 128 to 255). The unpack high operations for the lower lane may include an interleaved unpack of the high order 32-bit or doubleword data elements from the high order quadwords (64-bits) in the lower lane of the first and second source operands. The unpack low operations for the upper lane may include an interleaved unpack of the low order 32-bit or doubleword data elements from the low order quadwords (64-bits) in the upper lane of the first and second source operands.

As shown, the result operand may include the third data element (X2) stored to bits 0 through 31 of a destination register, the eleventh data element (Y2) stored to bits 32 through 63 of the destination register, the fourth data element (X3) stored to bits 64 through 95 of the destination register, the twelfth data element (Y3) stored to bits 96 through 127 of the destination register, the fifth data element (X4) stored to bits 128 through 159 of the destination register, the thirteenth data element (Y4) stored to bits 160 through 191 of the destination register, the sixth data element (X5) stored to bits 192 through 223 of the destination register, and the fourteenth data element (Y5) stored to bits 224 through 255 of the destination register.

Figure 8:
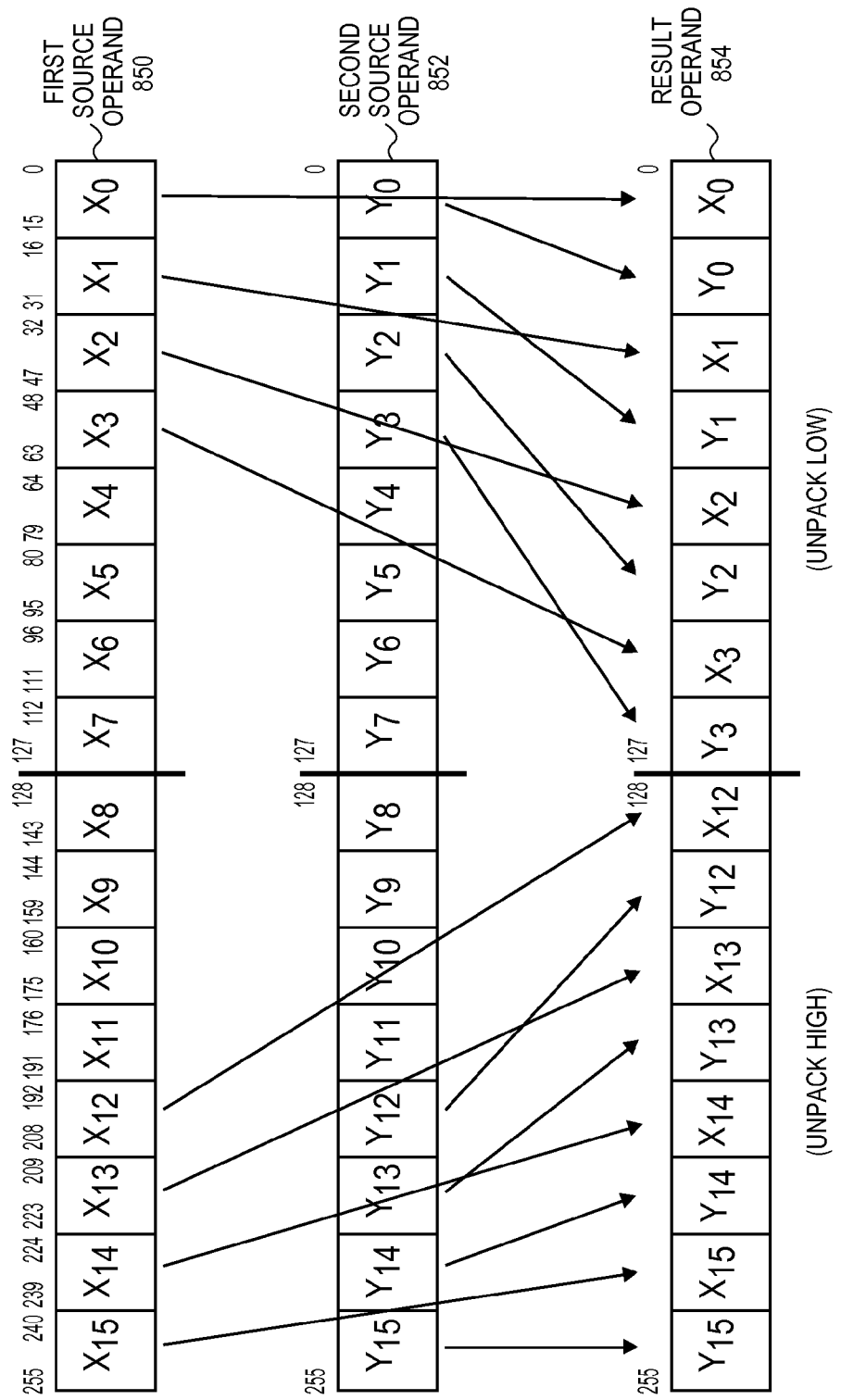
FIG. 8 illustrates unpacking 16-bit word packed data elements in 256-bit operands having two lanes according to a third single cross-lane unpack instruction that specifies unpack low operations for a lower lane and unpack high operations for an upper lane.

FIG. 8 illustrates unpacking 16-bit word packed data elements in 256-bit operands having two lanes according to a third single cross-lane unpack instruction that specifies unpack low operations for a lower lane (bits 0 to 127) and unpack high operations for an upper lane (bits 128 to 255).

A first source operand 850 has 256-bits and stores sixteen packed 16-bit or word data elements. The first source operand may be stored in a register (e.g., a YMM register), a memory, or another storage location. These data elements are labeled, from low order to high order, X0 through X15. Data elements X0 through X7 correspond to the lower lane. Data elements X8 through X15 correspond to the upper lane.

Similarly, a second source operand 852 has 256-bits and stores sixteen packed 16-bit or word data elements. The first source operand may be stored in a register (e.g., a YMM register), a memory, or another storage location. These data elements are labeled, from low order to high order, Y0 through Y15. Data elements Y0 through Y7 correspond to a lower lane. Data elements Y8 through Y15 correspond to an upper lane.

A result operand 854 stores a result. The result is generated based on performing unpack operations specified by the third cross-lane unpack instruction. The result may be stored by an execution unit, a functional unit, or another portion of a processor as a result of the cross-lane unpack instruction (e.g., as a result of an execution unit executing one or more microinstructions or other instructions decoded, translated, or otherwise derived from the instruction).

The result operand has 256-bits and stores sixteen packed 16-bit or word data elements. The sixteen data elements in the result operand represent a subset, less than all, or half of the unpacked and interleaved data elements selected from the first and second source operands according to unpack operations specified by the third cross-lane unpack instruction.

This particular third cross-lane unpack instruction specifies unpack low operations for the lower lane (bits 0 to 127) and unpack high operations for the upper lane (bits 128 to 255). The unpack low operations for the lower lane may include an interleaved unpack of the low order 16-bit or word data elements from the low order quadwords (64-bits) in the lower lane of the first and second source operands. The unpack high operations for the upper lane may include an interleaved unpack of the high order 16-bit or word data elements from the high order quadwords (64-bits) in the upper lane of the first and second source operands.

As shown, the result operand includes, from low order to high order, the ordered data elements X0, Y0, X1, Y1, X2, Y2, X3, Y3 in the lower lane. The result operand includes, from low order to high order, the ordered data elements X12, Y12, X13, Y13, X14, Y14, X15, Y15 in the upper lane.

Figure 9:
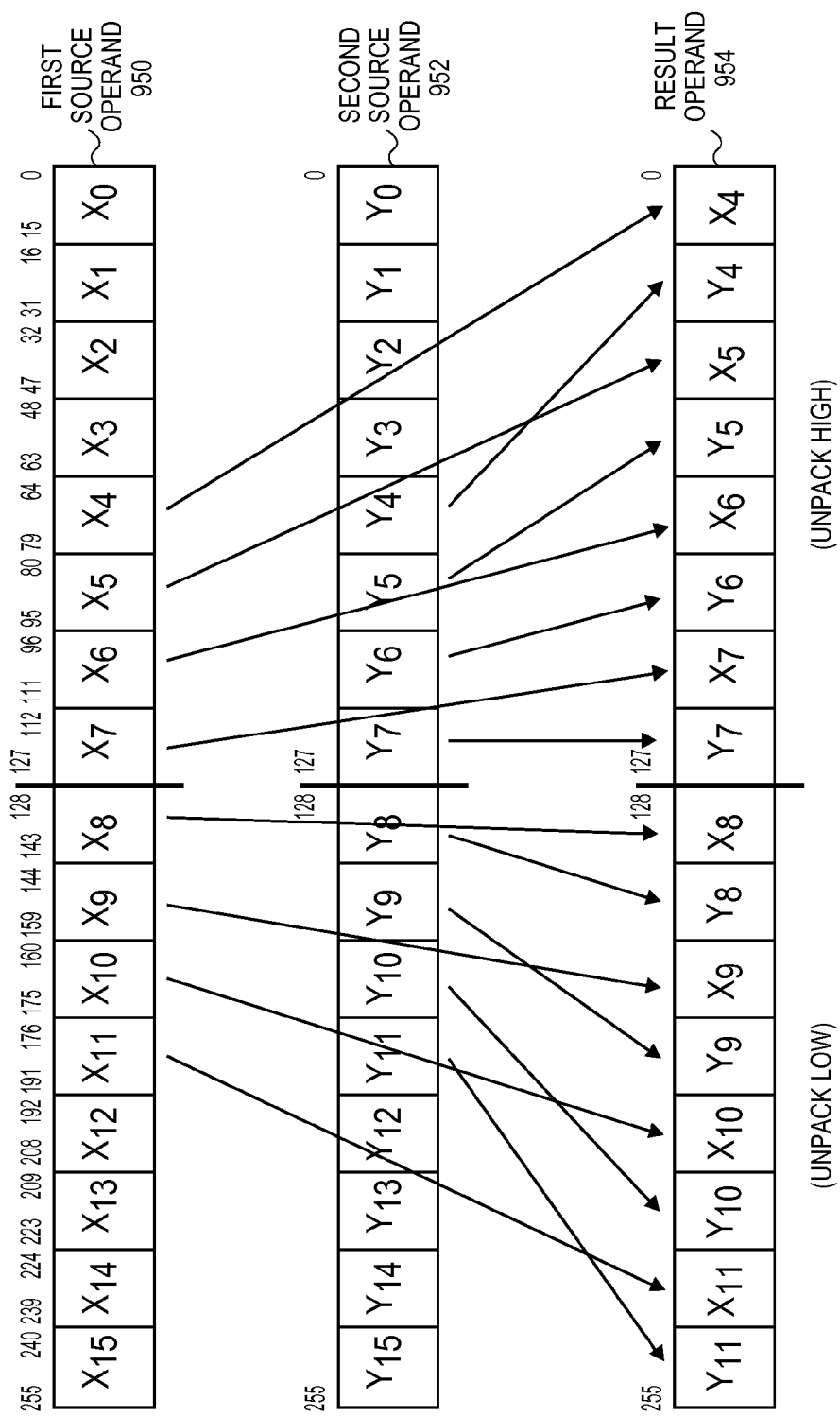
FIG. 9 illustrates unpacking 16-bit word packed data elements in 256-bit operands having two lanes according to a fourth single cross-lane unpack instruction that specifies unpack high operations for a lower lane and unpack low operations for an upper lane.

FIG. 9 illustrates unpacking 16-bit word packed data elements in 256-bit operands having two lanes according to a fourth single cross-lane unpack instruction that specifies unpack high operations for a lower lane (bits 0 to 127) and unpack low operations for an upper lane (bits 128 to 255).

A first source operand 950 has 256-bits and stores sixteen packed 16-bit or word data elements. The first source operand may be stored in a register (e.g., a YMM register), a memory, or another storage location. These data elements are labeled, from low order to high order, X0 through X15. Data elements X0 through X7 correspond to the lower lane. Data elements X8 through X15 correspond to the upper lane.

Similarly, a second source operand 952 has 256-bits and stores sixteen packed 16-bit or word data elements. The first source operand may be stored in a register (e.g., a YMM register), a memory, or another storage location. These data elements are labeled, from low order to high order, Y0 through Y15. Data elements Y0 through Y7 correspond to a lower lane. Data elements Y8 through Y15 correspond to an upper lane.

A result operand 954 stores a result. The result is generated based on performing unpack operations specified by the fourth cross-lane unpack instruction. The result may be stored by an execution unit, a functional unit, or another portion of a processor as a result of the cross-lane unpack instruction (e.g., as a result of an execution unit executing one or more microinstructions or other instructions decoded, translated, or otherwise derived from the instruction).

The result operand has 256-bits and stores sixteen packed 16-bit or word data elements. The sixteen data elements in the result operand represent a subset, less than all, or half of the unpacked and interleaved data elements selected from the first and second source operands according to unpack operations specified by the fourth cross-lane unpack instruction.

This particular fourth cross-lane unpack instruction specifies unpack high operations for the lower lane (bits 0 to 127) and unpack low operations for the upper lane (bits 128 to 255). The unpack high operations for the lower lane may include an interleaved unpack of the high order 16-bit or word data elements from the high order quadwords (64-bits) in the lower lane of the first and second source operands. The unpack low operations for the upper lane may include an interleaved unpack of the low order 16-bit or word data elements from the low order quadwords (64-bits) in the upper lane of the first and second source operands.

As shown, the result operand includes, from low order to high order, the ordered data elements X4, Y4, X5, Y5, X6, Y6, X7, Y7 in the lower lane. The result operand includes, from low order to high order, the ordered data elements X8, Y8, X9, Y9, X10, Y10, X11, Y11 in the upper lane.

As shown in each of FIGS. 6-9, the result operands have only a subset (in particular half) of the data elements from the first and second operands. The lower lanes of the result operands have only a subset (in particular half) of the data elements from the lower lane of the first and second operands. Likewise, the upper lanes of the result operands have only a subset (in particular half) of the data elements from the upper lane of the first and second operands.

Also, data elements from the first and second operands are stored in the result operand in the same order as these data elements appear in the first and second operands, respectively. This is true for the result operand overall, as well as within each lane.

In FIGS. 6-9, 256-bit operands having two 128-bit lanes have been discussed, although the scope of embodiments of the invention are not so limited. The operands may have either fewer or more bits. Likewise, the lanes may have either fewer or more bits. As one illustrative example, the operands may be 128-bits and the lanes may be 64-bits. As another illustrative example, the operands may have 512-bits and the lanes may have 64-bits or 128-bits.

To further illustrate certain concepts, consider one example use of an example cross-lane unpack instruction. In certain algorithms, such as, for example, a Structure of Arrays (SoA) to Array of Structures (AoS) algorithm, it is desirable to interleave data elements from two operands while maintaining the same order that the data elements appear in the operands. Listed below is a first source operand having four data elements (0, 2, 4, 6) duplicated in lower lane and an upper lane. Likewise, a second source operand has another four data elements (1, 3, 5, 7) duplicated in the lower lane and the upper lane. By way of example, these data elements may be replicated by the Intel AVX broadcast instruction. As shown below, a cross-lane unpack instruction specifying unpack low operations for the low lane and unpack high operations for the high lane may achieve a result operand in which all of the data elements from the first and second operands are interleaved and ordered in the same order as these data elements appear in the source operands and the results are continuous.

a. First Source Operand: 6 4 2 0 | 6 4 2 0
b. Second Source Operand: 7 5 3 1 | 7 5 3 1
c. Result Operand: 7 6 5 4 | 3 2 1 0

This is just one illustrative example that illustrates one specific use of a particular cross-lane unpack instruction. Other uses and advantages of the cross-lane unpack instructions will be apparent to those skilled in the art and having the benefit of the present disclosure.

Figure 10:
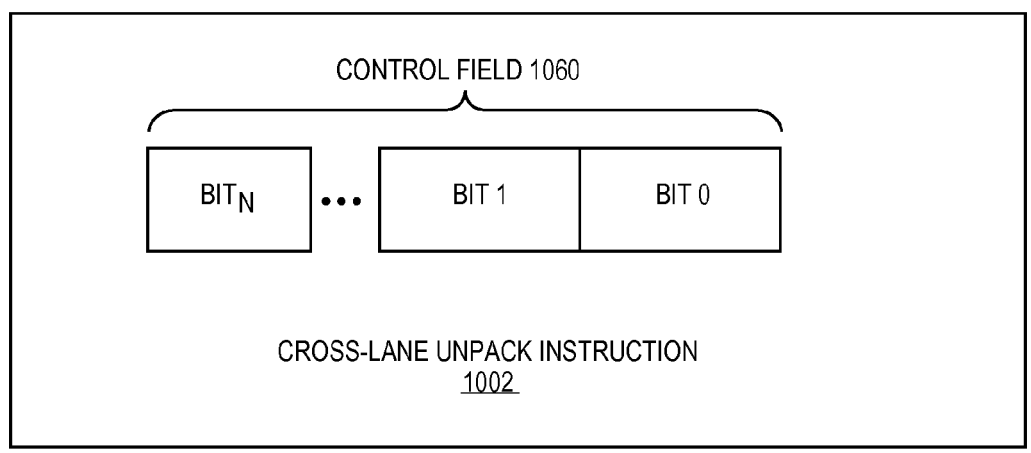
FIG. 10 is a simplified block diagram of an embodiment of a cross-lane unpack instruction having a control field to specify what types of unpack operations are to be performed for each lane.

FIG. 10 is a simplified block diagram of an embodiment of a cross-lane unpack instruction 1002 having a control field 1060 to specify what types of unpack operations are to be performed. The control field has a plurality of bits. In the illustration, a first bit ($bit_0$) corresponds to a first lane, a second bit ($bit_1$) corresponds to a second lane, and an Nth bit ($bit_N$) corresponds to an Nth lane, where N is an integer often ranging from 2-5. In one or more embodiments, each bit may have a first predetermined value (e.g., 0) to indicate a first type of unpack operation (e.g., unpack low operations) for the corresponding lane and a second predetermined value (e.g., 1) to indicate a second type of unpack operation (e.g., unpack high operations) for the corresponding lane. Alternatively, two, three, or more bits may optionally be used to specify the unpack operations for each lane. Alternatively, rather than an instruction having a control field to specify what operations are performed, an instruction may perform a single predetermined combination of unpack operations, and if desired multiple instructions may be included to provide multiple different combinations of unpack operations.

Figure 11:
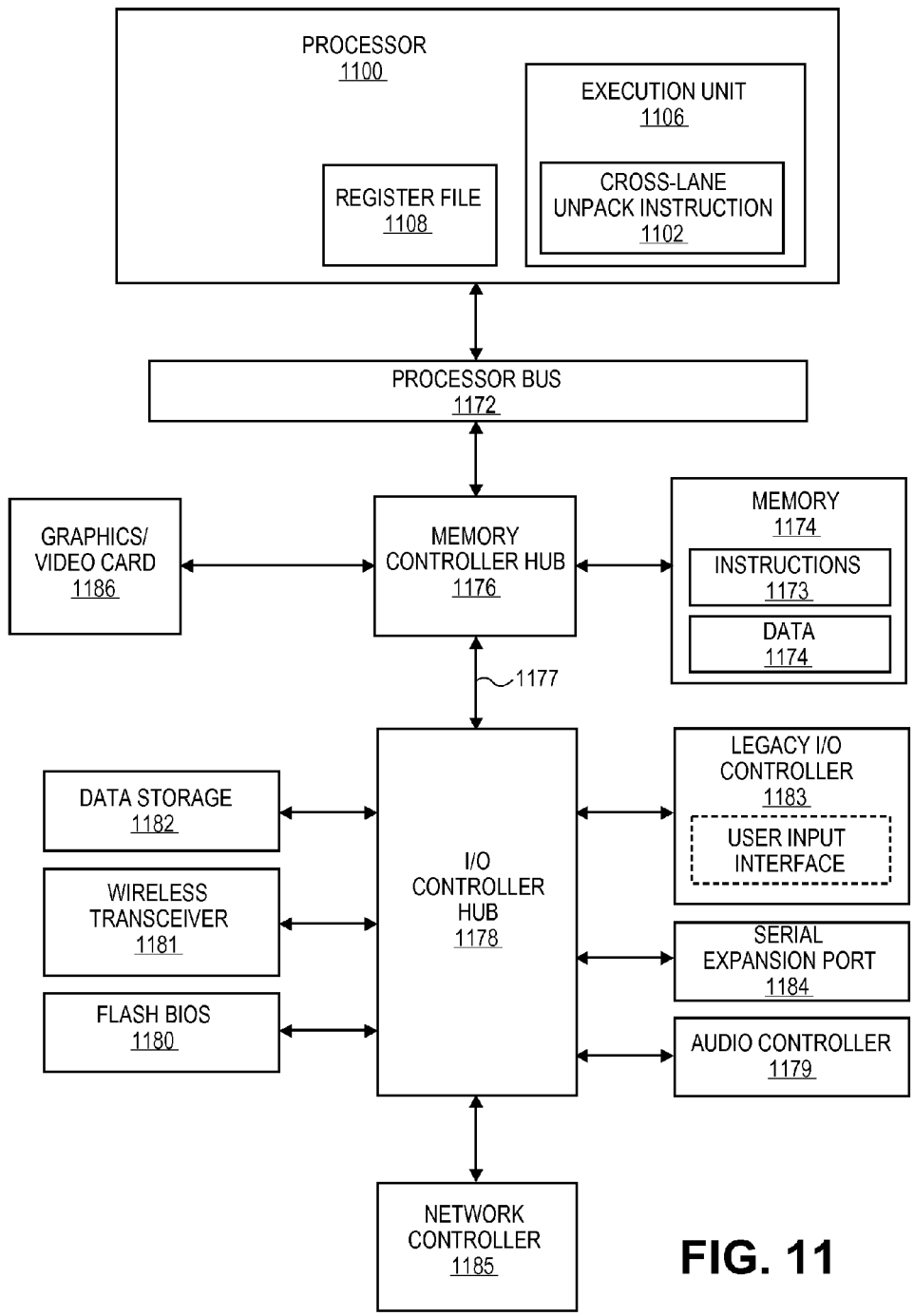
FIG. 11 is a block diagram of an example embodiment of a computer system that is suitable for implementing one or more embodiments of the invention.

FIG. 11 is a block diagram of an example embodiment of a computer system 1170 that is suitable for implementing one or more embodiments of the invention. The computer system is representative of processing systems such as those based on the PENTIUM® 4, PENTIUM® Dual-Core, Core™ 2 Duo and Quad, Xeon™, Itanium®, XScale™ and/or StrongARM™ microprocessors. However, this is just one particular example of a suitable computer system. Multi-processor systems, servers, and other computer systems having other designs or components are also suitable.

In one embodiment, the computer system may execute a version of the WINDOWS™ operating system, available from Microsoft Corporation of Redmond, Wash. Alternatively, other operating systems, such as, for example, UNIX, Linux, or embedded systems, may be used. Embodiments of the invention are not limited to any known specific combination of hardware circuitry and software.

The computer system includes a processor 1100. The processor includes at least one execution unit 1106. The execution unit and/or the processor may be capable of executing or otherwise processing at least one cross-lane unpack instruction 1102, as previously described. The processor also includes a register file 1108. In one or more embodiments, the register file includes registers having multiple lanes. That is, the processor may provide a SIMD architecture with multiple lanes. The illustrated processor is shown in a simplified format to avoid obscuring the description. It is to be appreciated that the processor may include other components, such as, for example, a cache, an instruction prefetcher, an instruction decoder or translator, a trace cache, a microcode (ucode) read only memory (ROM), an out of order engine, etc.

The processor is coupled to a processor bus or other interconnect 1172. The processor bus may be used to transmit data signals between the processor and other components in the system.

The computer system also includes a memory 1174. The memory may include a dynamic random access memory (DRAM), a static random access memory (SRAM), flash memory, other known types of memory, or a combination thereof. DRAM is an example of a type of memory used in some but not all computer systems. The memory may be used to store instructions 1173, such as software including one or more cross-lane unpack instructions, and data 1174.

The computer system is an example of a hub type architecture. The hub type architecture includes a memory controller hub (MCH) 1176. The MCH is a system logic chip. The MCH is coupled to the processor bus 1172 and the memory 1174. The processor may communicate with the MCH through the processor bus. The MCH may direct signals between the processor, the memory, and other components in the computer system. The MCH may also bridge signals between the processor bus, the memory, and a hub interface bus or other interconnect. The MCH provides a high bandwidth memory path to the memory that may be used to store and retrieve instructions and data.

In some embodiments, the system may optionally include a graphics device (e.g., a graphics/video card) 1186. The MCH may provide a graphics port and interconnect (e.g., an Accelerated Graphics Port (AGP) interconnect) to couple the graphics device.

The system also includes an I/O controller hub (ICH) 1178. The ICH is coupled to the MCH through hub interface bus or other interconnect 1177 that may include one or more buses. The ICH may provide direct connections to some I/O devices through a local I/O bus or other interconnect. The local I/O bus or other interconnect may represent a high-speed I/O bus or other interconnect to connect peripherals to the memory, the chipset, and the processor.

Several representative examples of peripherals are shown including an audio controller 1179, flash BIOS 1180, a wireless transceiver 1181, a data storage 1182 (e.g., a hard disk drive, a floppy disk drive, a CD-ROM device, a flash memory device, or the like), a legacy I/O controller 1183 to provide a user input interface (e.g., a keyboard), a serial expansion port 1184, such as a Universal Serial Bus (USB), and a network controller 1185. These particular peripherals are optional and not required.

It is to be appreciated that this is just one illustrative example of a suitable computer system. The scope of embodiments of the invention are not limited to any particular computer system design. Rather, a wide variety of other computer system designs are suitable. Such designs include, among others, those of laptops, desktops, engineering workstations, and servers, handheld PCs, personal digital assistants, and the like.

Moreover, embodiments may be applied in other devices having one or more processors or execution units. For example, other devices that may include a processor and/or execution unit operable to process one of the cross-lane unpack instructions disclosed herein include, but are not limited to, portable media players, cell phones, hand held devices, Internet Protocol devices, set-top boxes, network devices, network hubs, wide area network (WAN) switches, video game devices, graphics devices, digital signal processors (DSPs), micro controllers, embedded processors, and other logic circuits. Any electronic device or system that utilizes or may benefit from SIMD or packed data may potentially include logic to process a cross-lane unpack instruction as disclosed herein.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. A processor may include specific logic responsive to a machine instruction or one or more control signals derived from the machine instruction.

One or more embodiments of the invention may be provided as a program product or other article of manufacture that may include a tangible machine-accessible and/or readable medium having stored thereon one or more instructions (e.g., an unpack instruction) and/or data structures. The tangible medium may include one or more materials. The medium may provide instructions, which, if and when executed by a machine, may result in and/or cause the machine to perform one or more of the operations or methods disclosed herein. Suitable machines include, but are not limited to, computer systems, network devices, personal digital assistants (PDAs), modems, cellular phones, other wireless devices, and a wide variety of other electronic devices with one or more processors, to name just a few examples.

The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
    a decoder to decode an instruction that is to indicate a first operand and a second operand, each of the first and second operands to have a plurality of packed data elements that are to correspond in respective positions, in which a first subset of the packed data elements of the first operand which are adjacent to one another and a first subset of the packed data elements of the second operand which are adjacent to one another are each to correspond to a first lane, and in which a second subset of the packed data elements of the first operand which are adjacent to one another and a second subset of the packed data elements of the second operand which are adjacent to one another are each to correspond to a second lane;
    an execution unit coupled with the decoder, the execution unit to store a result in response to the instruction being decoded by the decoder, in which the result that is to be stored is to include: (1) in a portion of the result that is to correspond to the first lane, only all adjacent highest order data elements from the first subset of the first operand interleaved with all corresponding adjacent highest order data elements from the first subset of the second operand; and (2) in a portion of the result that is to correspond to the second lane, only all adjacent lowest order data elements from the second subset of the first operand interleaved with all corresponding adjacent lowest order data elements from the second subset of the second operand.

2. The processor of claim 1, wherein the first lane comprises a lower lane and the second lane comprises an upper lane.

3. The processor of claim 1, wherein the first lane comprises an upper lane and the second lane comprises a lower lane.

4. The processor of claim 1, wherein the instruction includes a control field, wherein one or more bits of the control field correspond to the first lane and indicate that the highest order data elements of the first and second operands are to be unpacked, and wherein one or more bits of the control field correspond to the second lane and indicate that the lowest order data elements of the first and second operands are to be unpacked.

5. The processor of claim 1, wherein the instruction has a first field to indicate the first operand, a second field to indicate the second operand, and a third field, which is different than the first and second fields, to indicate a destination where the result is to be stored, and wherein storing the result comprises storing the result at the destination.

6. The processor of claim 1, wherein the instruction comprises a cross-lane unpack instruction.

7. The processor of claim 1, wherein each of the first and second lanes has 128-bits.

8. The processor of claim 1, wherein the execution unit is to store the result that comprises: (1) in the first lane, only half of the data elements from the first subsets; and (2) in the second lane, only half of the data elements from the second subsets.

9. The processor of claim 1, wherein the execution unit is to store a result that comprises, in the first lane, the highest order data elements from the first subset of the first operand in a same order as the highest order data elements appear in the first subset of the first operand.

10. The processor of claim 1, wherein the execution unit is to store a result that comprises at least eight data elements that are each from one of the first and second operands.

11. The processor of claim 1, wherein the execution unit comprises a circuit, and wherein the instruction comprises a machine instruction, and wherein the execution unit comprises particular logic operable to store the result due to the machine instruction.

12. A processor comprising:
    a first register to store a first source operand that is to include a first data element in bits 0 through 31, a second data element in bits 32 through 63, a third data element in bits 64 through 95, a fourth data element in bits 96 through 127, a fifth data element in bits 128 through 159, a sixth data element in bits 160 through 191, a seventh data element in bits 192 through 223, and an eighth data element in bits 224 through 255;
    a second register to store a second source operand that is to include a ninth data element in bits 0 through 31, a tenth data element in bits 32 through 63, an eleventh data element in bits 64 through 95, a twelfth data element in bits 96 through 127, a thirteenth data element in bits 128 through 159, a fourteenth data element in bits 160 through 191, a fifteenth data element in bits 192 through 223, and a sixteenth data element in bits 224 through 255;
    a decoder to decode an instruction that is to indicate the first register and the second register; and
    an execution unit coupled with the decoder and the first and second registers, the execution unit as in response to the instruction being decoded by the decoder to store a result, the result that is to be stored to include the first data element to be stored to bits 0 through 31 of a destination register, the ninth data element to be stored to bits 32 through 63 of the destination register, the second data element to be stored to bits 64 through 95 of the destination register, the tenth data element to be stored to bits 96 through 127 of the destination register, the seventh data element to be stored to bits 128 through 159 of the destination register, the fifteenth data element to be stored to bits 160 through 191 of the destination register, the eighth data element to be stored to bits 192 through 223 of the destination register, and the sixteenth data element to be stored to bits 224 through 255 of the destination register.

13. The processor of claim 12, wherein the instruction includes one or more bits to indicate that an unpack low operation is to be performed for lowest order lanes of the first and second registers.

14. A processor comprising:
  a plurality of registers;
  a decoder to decode an instruction, the instruction to indicate a first operand and a second operand, the first and second operands to have a plurality of packed data elements that are to correspond in same bit positions within the first and second operands;
  an execution unit coupled with the decoder and the plurality of registers, the execution unit operable, as a result of the instruction, to store a result, in which the result is to include:
  (1) in a lowest order half of the result, only highest order data elements from a lowest order half of the first operand interleaved with corresponding highest order data elements from a lowest order half of the second operand; and
  (2) in a highest order half of the result, only lowest order data elements from a highest order half of the first operand interleaved with corresponding lowest order data elements from a highest order half of the second operand.

15. The processor of claim 14, wherein the instruction is to have one or more bits to indicate that the lowest order half of the result is to include the highest order data elements from the lowest order halves of the first and second operands.

16. A processor comprising:
  a decoder to decode an instruction, the instruction to indicate a first source operand and a second source operand, the first source operand to include a data element X4 in bits [79:64], a data element X5 in bits [95:80], a data element X6 in bits [111:96], a data element X7 in bits [127:112], a data element X8 in bits [143:128], a data element X9 in bits [159:144], a data element X10 in bits [175:160], and a data element X11 in bits [191:176], the second source operand to include a data element Y4 in bits [79:64], a data element Y5 in bits [95:80], a data element Y6 in bits [111:96], a data element Y7 in bits [127:112], a data element Y8 in bits [143:128], a data element Y9 in bits [159:144], a data element Y10 in bits [175:160], and a data element Y11 in bits [191:176]; and an execution unit after the decoder decodes the instruction to store a result, the result to include the data element X4 in bits [15:0], the data element Y4 in bits [31:16], the data element X5 in bits [47:32], the data element Y5 in bits [63:48], the data element X6 in bits [79:64], the data element Y6 in bits [95:80], the data element X7 in bits [111:96], the data element Y7 in bits [127:112], the data element X8 in bits [143:128], the data element Y8 in bits [159:144], the data element X9 in bits [175:160], the data element Y9 in bits [191:176], the data element X10 in bits [208:192], the data element Y10 in bits [223:209], the data element X11 in bits [239:224], and the data element Y11 in bits [255:240].

17. The processor of claim 16, wherein the decoder is to decode the instruction which is to have a control field having at least one bit to indicate one of an unpack low operation and an unpack high operation.

* * * * *